US012731428B2

(12) United States Patent
Kolavennu et al.

(10) Patent No.: US 12,731,428 B2
(45) **Date of Patent: *Sep. 8, 2026**

(54) SYSTEMS AND METHODS FOR CHECK FRAUD DETECTION

(71) Applicant: U.S. Bank National Association, Minneapolis, MN (US)

(72) Inventors: Soumitri Naga Kolavennu, Plymouth, MN (US); Priyanka Singhal, Atlanta, GA (US); Varshini Sriram, Menlo Park, CA (US); Lavanya Basavaraju, Minneapolis, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/340,465

(22) Filed: Sep. 25, 2025

(65) Prior Publication Data

US 2026/0024369 A1 Jan. 22, 2026

Related U.S. Application Data

(63) Continuation of application No. 18/052,081, filed on Nov. 2, 2022.

(51) Int. Cl.
*G06V 30/42* (2022.01)
*G06N 20/00* (2019.01)
(Continued)

(52) U.S. Cl.
CPC ............ *G06V 30/42* (2022.01); *G06N 20/00* (2019.01); *G06Q 20/4016* (2013.01); (Continued)

(58) Field of Classification Search
CPC .... G06V 30/42; G06V 30/414; G06V 30/418; G06V 40/33; G06N 20/00; G06Q 20/4016; G06Q 40/02; G06Q 20/042
See application file for complete search history.

(56) References Cited

U.S. PATENT DOCUMENTS 7,890,426 B2 2/2011 Maloney
7,978,901 B1 7/2011 Barron
(Continued)

FOREIGN PATENT DOCUMENTS

CN 108734185 A 11/2018

OTHER PUBLICATIONS

"Mummoorthy Murugesan et. al., Efficient Privacy-Preserving Similar Document Detection, 2010, The VLDB Journal 19, 457-475" (Year: 2010).*

(Continued)

*Primary Examiner* — Chineyere Wills-Burns
*Assistant Examiner* — Phuong Hau Cai
(74) *Attorney, Agent, or Firm* — Merchant & Gould P.C.

(57) ABSTRACT

Aspects of the embodiments described herein are related to systems, methods, and computer products for performing automatic check fraud detection. Aspects of embodiments described herein provide artificial intelligence systems and methods that analyze an image of an incoming check, compare the features of the image to the associated features on a reference check, and generate a check fraud score based on the comparison, and either approve the incoming check or flag the incoming check for manual review.

20 Claims, 7 Drawing Sheets

(51) Int. Cl.

| | |
|---|---|
| ***G06Q 20/04*** | (2012.01) |
| ***G06Q 20/40*** | (2012.01) |
| ***G06Q 40/02*** | (2023.01) |
| ***G06V 30/414*** | (2022.01) |
| ***G06V 30/418*** | (2022.01) |
| ***G06V 40/30*** | (2022.01) |

(52) U.S. Cl.
CPC .......... *G06Q 40/02* (2013.01); *G06V 30/414* (2022.01); *G06V 30/418* (2022.01); *G06V 40/33* (2022.01); *G06Q 20/042* (2013.01)

(56) References Cited

U.S. PATENT DOCUMENTS

| | | | | |
|---|---|---|---|---|
| 8,959,033 | B1 | 2/2015 | Oakes, III | |
| 11,334,771 | B2 * | 5/2022 | Regina | G06V 10/764 |
| 2004/0089711 | A1 | 5/2004 | Sandru | |
| 2004/0247168 | A1 | 12/2004 | Pintsov et al. | |
| 2006/0041506 | A1 | 2/2006 | Mason et al. | |
| 2006/0124727 | A1 | 6/2006 | Kotovich | |
| 2006/0124728 | A1 | 6/2006 | Kotovich | |
| 2006/0202012 | A1 | 9/2006 | Grano | |
| 2011/0235866 | A1 * | 9/2011 | Endo | G06T 7/254 382/107 |
| 2013/0013491 | A1 | 1/2013 | Selway et al. | |
| 2014/0108243 | A1 | 4/2014 | Breeden, Jr | |
| 2015/0012442 | A1 | 1/2015 | Ceribelli | |
| 2015/0332128 | A1 | 11/2015 | Sadovsky | |
| 2017/0309108 | A1 | 10/2017 | Sadovsky | |
| 2021/0090086 | A1 | 3/2021 | Kriegsfeld | |
| 2021/0090372 | A1 | 3/2021 | Kriegsfield | |
| 2021/0124919 | A1 | 4/2021 | Balakrishnan | |
| 2022/0210172 | A1 * | 6/2022 | Tan | G06F 21/554 |
| 2022/0366513 | A1 | 11/2022 | Vadlamudi | |
| 2023/0120865 | A1 | 4/2023 | Nascimento | |
| 2023/0132261 | A1 * | 4/2023 | Bulatov | G06V 30/19013 382/118 |
| 2023/0377055 | A1 | 11/2023 | Vudathu | |
| 2024/0046242 | A1 | 2/2024 | Vudathu | |
| 2024/0062041 | A1 | 2/2024 | Choudhary | |
| 2024/0144204 | A1 | 5/2024 | Kolavennu | |

OTHER PUBLICATIONS

"Changlin Li et. al., Density Map Guided Object Detection in Aerial Images, 2020, Proceedings of the IEEE/CVF Conference on Computer Vision and Pattern Recognition Workshops, pp. 190-191" (Year: 2020).*

"Cheng-Jian Lin et. al., Automatic Receipt Recognition System Based on Artificial Intelligence Technology, Dec. 2021, Appl. Sci. 2022, 12(2)" (Year: 2021).*

Kofax Inc., Counterfeit Check Detection to Reduce Your Risk in Real Time—Image-based counterfeit check detection software that can quickly assess fraud to mitigate your exposure; 2022, 9 pages.

Kofax Inc., Product Summary, Kofax FraudOne—Detect Check Fraud in Real Time With Image-Based Kofax Solution; 2019, 2 pages.

Kofax Inc., Kofax FraudOne Administrator's Guide Version: 4.4.2, Jan. 31, 2020, 316 pages.

Orbograph, https://orbograph.com/, OrboGraph Intelligent Payment Automation, AI-Based Check Recognition, 2022, 12 pages.

Orbograph, https://orbograph.com/; Anywhere Fraud—Now featuring OrbNet Forensic AI to deliver 95%+ prevention rates on targeted fraud use cases, 2022, 10 pages.

* cited by examiner

SYSTEMS AND METHODS FOR CHECK FRAUD DETECTION

CROSS REFERENCE TO RELATED APPLICATIONS

This application claims priority to and is a Continuation of U.S. patent application Ser. No. 18/052,081, filed Nov. 2, 2022, which is hereby incorporated by reference in its entirety.

FIELD OF THE DISCLOSURE

Examples described herein generally relate to systems and methods for fraud detection, and more specifically, for check fraud detection.

BACKGROUND

Financial institutions receive millions of incoming checks daily. In cases of suspected fraud, various aspects of an incoming check are reviewed and compared to one or more validated reference checks to detect intentional fraud or other accidental issues such as, for example, double presentment. A reviewer of a check in question may review information such as signatures, the check stock, logos, security features, amount, and the date of the incoming check, and compare this information to reference checks to determine whether the incoming check is likely to be fraudulent or valid. Manual review of even a fraction of the millions of incoming checks to detect intentional and accidental fraud is time and cost prohibitive. What is needed are systems and methods for automating the incoming check review process.

SUMMARY

Figure 1:
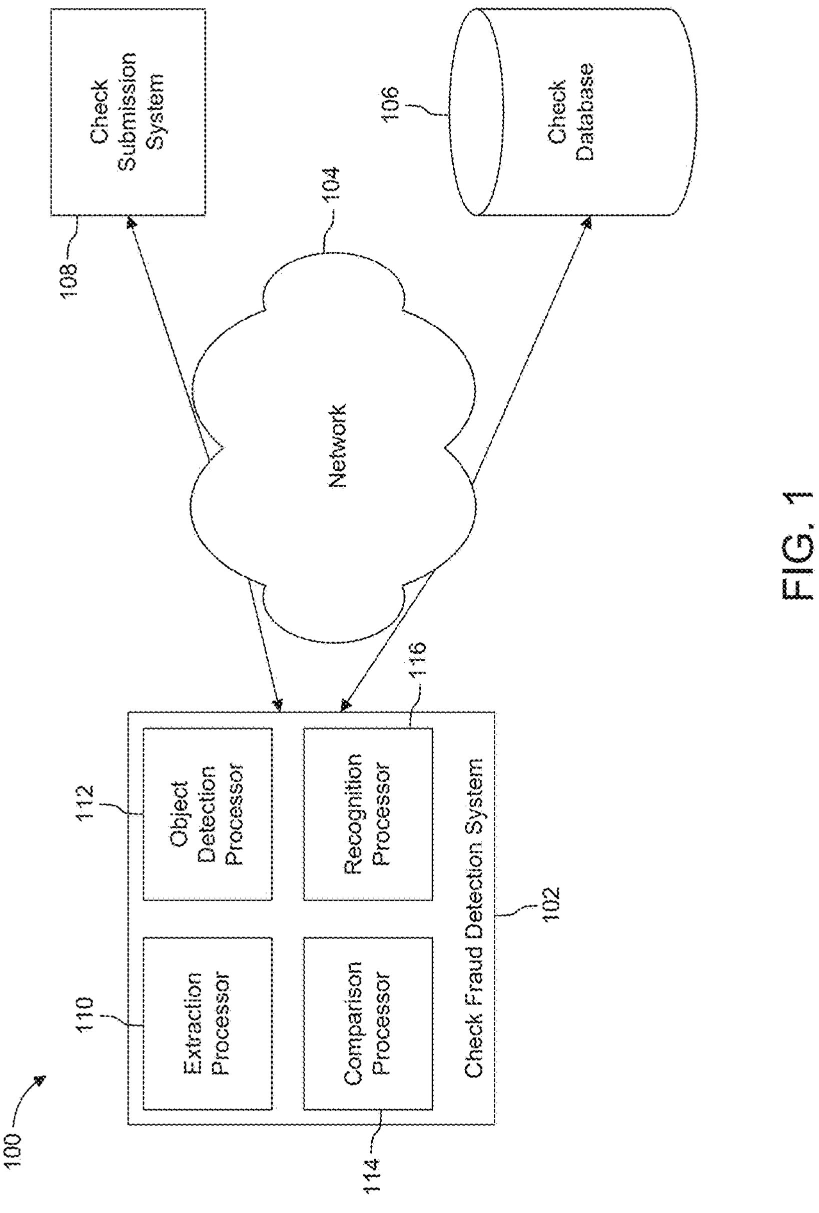
FIG. 1 is block diagram of an operating environment for a check fraud detection system according to an example.

Aspects of the embodiments described herein are related to systems, methods, and computer products for performing automatic check fraud detection. Generally, artificial intelligence systems and methods analyze an image of an incoming check, compare the features of the image to the associated features on a reference check, and generate a check fraud score based on the comparison. In addition, the systems and methods either approve the incoming check or flag the incoming check for manual review.

In one aspect, there is a method for detecting check fraud. The method comprises receiving an incoming check image; detecting a plurality of incoming check objects of interest on the incoming check image; generating one or more incoming check bounding boxes enclosing one or more of the plurality of incoming check objects of interest; calculating Intersection over Union (IoU) metrics for the one or more incoming check bounding boxes and one or more reference check bounding boxes enclosing one or more corresponding reference check objects of interest on a reference check; determining an IoU score based on the IoU metrics; and determining a fraud score based on the IoU score. In an example embodiment, the incoming check objects of interest and the reference check objects of interest are any one of (i) a signature line, (ii) a date line, (iii) a payee line, (iv) a logo, (v) a memo, (vi) a payer information section, (vii) a magnetic ink character recognition (MICR) line, (viii) an amount box, (ix) an amount line, (x) a bank information section, (xi) a check number section, (xii) a routing number section, (xiii) an account number section, (xiv) a bank fractional section, (xv) a security watermark section, (xvi), an endorsement section, or (xvii) any combination of (i)-(xvi). The method can further include determining the incoming check is valid based on the fraud score; and approving the incoming check. The method can additionally include saving the incoming check as a new reference check. The method can further include determining the incoming check requires review based on the fraud score; and flagging the incoming check. The method may also include converting the incoming check image to a format; resizing the incoming check image; determining coordinates of the objects of interest in the resized incoming check image; and converting the incoming check image to an original size, wherein the converting includes mapping the bounding boxes of the objects of interest based on the coordinates. The method can additionally include determining one or more of the incoming check objects of interest are variable objects of interest in the incoming check image; creating an incoming check stock image, wherein the incoming check stock image excludes the variable objects of interest; comparing the incoming check stock image and a reference check stock image using a machine learning algorithm; and determining an image pattern score based on the comparison of the incoming check stock image and the reference check stock image, wherein determining the fraud score is based on the image pattern score. The method may further include training the machine learning algorithm to create hashes (e.g., embeddings) in a manner that have close Euclidean distance or cosine similarity between checks from the same check stock and a large Euclidean distance or cosine similarity for checks from different check stocks or altered check stock. Comparing the incoming check stock image and the reference check stock image using the machine learning algorithm can include using the machine learning algorithm to create and store a target hash based on the reference check stock image; using the machine learning algorithm to create an incoming hash based on the incoming check stock image; and calculating any one of (i) Euclidean distances between the target hash and the incoming hash, (ii) a cosine similarity between the target hash and the incoming hash, or (iii) a combination of (i) and (ii).

In another aspect, there is a method for detecting check fraud. The method includes receiving an image of an incoming check; detecting a plurality of incoming check objects of interest on the incoming check image; generating one or more incoming check bounding boxes enclosing one or more of the plurality of incoming check objects of interest; calculating Intersection over Union (IoU) metrics for the one or more incoming check bounding boxes and one or more reference check bounding boxes enclosing one or more corresponding objects on a reference check; determining an IoU score based on the IoU metrics; determining one or more of the plurality of objects of interest of the incoming check image are variable objects of interest; creating an incoming check stock image, wherein the incoming check stock image excludes the variable objects of interest; comparing the incoming check stock image and a reference check stock image using a machine learning algorithm; determining an image pattern score based on the comparison of the incoming check stock image and the reference check stock image; detecting a signature of the incoming check; comparing the signature of the incoming check and one or more reference signatures using the machine learning algorithm; determining a signature score based on the comparison of the signature of the incoming check and the one or more reference signatures; and determining a fraud score based on the IoU score, the image pattern score, and the signature score. The method may include detecting a date and an amount of the incoming check using character recognition; and determining a double presentment score based on the detected date and amount, wherein determining the fraud score is based on the double presentment score. Comparing the incoming check stock image and the reference check stock image using the machine learning algorithm can include using the machine learning algorithm to create and store a target hash based on the reference check stock images; using the machine learning algorithm to create an incoming hash based on the incoming check stock image; and calculating any one of (i) Euclidean distances between the target hash and the incoming hash, (ii) a cosine similarity between the target hash and the incoming hash, or (iii) a combination of (i) and (ii). Comparing the signature of the incoming check and the one or more reference signatures using the machine learning algorithm may include using the machine learning algorithm to create and store a target hash based on the one or more reference signatures; using the machine learning algorithm to create an incoming hash based on the signature of the incoming check; and calculating any one of (i) Euclidean distances between the target hash and the incoming hash, (ii) a cosine similarity between the target hash and the incoming hash, or (iii) a combination of (i) and (ii).

In another aspect, there is a non-transitory computer-readable medium having stored thereon one or more sequences of instructions for causing one or more processors to perform receiving an image of an incoming check; detecting a plurality of incoming check objects of interest on the incoming check image; generating one or more incoming check bounding boxes enclosing one or more of the plurality of incoming check objects of interest; calculating Intersection over Union (IoU) metrics for the one or more incoming check bounding boxes and one or more reference check bounding boxes enclosing one or more corresponding objects on a reference check; determining an IoU score based on the IoU metrics; determining one or more of the plurality of objects of interest of the incoming check image are variable objects of interest; creating an incoming check stock image, wherein the incoming check stock image excludes the variable objects of interest; comparing the incoming check stock image and a reference check stock image using a machine learning algorithm; determining an image pattern score based on the comparison of the incoming check stock image and the reference check stock image; detecting a signature of the incoming check; comparing the signature of the incoming check and one or more reference signatures using the machine learning algorithm; determining a signature score based on the comparison of the signature of the incoming check and the one or more reference signatures; and determining a fraud score based on the IoU score, the image pattern score, and the signature score. The sequences of instructions may further cause the one or more processors to perform detecting a date and an amount of the incoming check using character recognition; and determining a double presentment score based on the detected date and amount, wherein determining the fraud score is based on the double presentment score. Comparing the incoming check stock image and the reference check stock image using the machine learning algorithm can include using the machine learning algorithm to create and store a target hash based on the reference check stock images; using the machine learning algorithm to create an incoming hash based on the incoming check stock image; and calculating any one of (i) Euclidean distances between the target hash and the incoming hash, (ii) a cosine similarity between the target hash and the incoming hash, or (iii) a combination of (i) and (ii). Comparing the signature of the incoming check and the one or more reference signatures using the machine learning algorithm may include using the machine learning algorithm to create and store a target hash based on the one or more reference signatures; using the machine learning algorithm to create an incoming hash based on the signature of the incoming check; and calculating any one of (i) Euclidean distances between the target hash and the incoming hash, (ii) a cosine similarity between the target hash and the incoming hash, or (iii) a combination of (i) and (ii).

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is block diagram of an operating environment 100 for a check fraud detection system 102 according to an example. The check fraud detection system 102 can communicate, via a network 104, with a check database 106 and a check submission system 108. In an example implementation, the check fraud detection system 102 includes an extraction processor 110, an object detection processor 112, a comparison processor 114, and a recognition processor 116.

The extraction processor 110 operates to perform image processing on check images so the check images can be used by the object detection processor 112. In certain embodiments, the object detection processor 112 compares check images in the same format and the same size (e.g., the number of vertical pixels and the number of horizontal pixels) to prevent object detection issues. For example, the object detection processor 112 may not be able to accurately or otherwise effectively compare check images of different sizes (e.g., comparing a check image that has a size of 600 pixels by 600 pixels with a check image that has a size of 1200 pixels by 800 pixels), because objects of interest can appear to be in different locations only because the two check images are different sizes. Similarly, check images with different formats may appear to be different only because of the different formats.

The extraction processor 110 operates to convert check images into a format the object detection processor 112 uses, resize the check images into a size used for the object detection processor 112, and the like. For example, a customer can submit check images in different ways and with different devices. Therefore, the check images may be submitted in different formats and/or different sizes based on the way the check is submitted. Thus, the extraction processor 110 operates to determine whether a check received from the check submission system 108 and/or the check database 106 needs to be reformatted and/or resized, and the extraction processor 110 operates to perform the reformatting and/or resizing before the object detection processor 112 uses the check image.

The object detection processor 112 operates to use combinations of object detection and image segmentation algorithms to detect objects of interest on a check using an image of a check, such as an incoming check image submitted via the check submission system 108 and/or a check image stored in the check database 106. The objects of interest can include a logo, a Magnetic Ink Character Recognition (MICR) line, a date line or box, a signature line or box, an amount line or box, payee information, payer information, security watermarks, a memo section, an endorsement section on the back of the check, a bank fractional section, a bank information section, a calculating intersection, a check number section, and the like. The object detection processor 112 operates to create bounding boxes that define the position of each detected object of interest on a check image. In example embodiments, the bounding boxes are a box defined by a first horizontal pixel value, a second horizontal pixel value, a first vertical pixel value, and a second vertical pixel value. For example, for an 800 pixel by 600 pixel check image, the object detection processor 112 operates to determine a bounding box for a date line defined by horizontal pixel values 600 and 675 and vertical pixel values 450 and 500. Thus, the area of the bounding box for the date line is defined by the two horizontal pixel values and the two vertical pixel values, giving the bounding box a rectangular shape. The object detection processor 112 can also operate to tag or otherwise label the bounding boxes with the object of interest the bounding box is defining the position of. Thus, the check fraud detection system 102 can identify the associated object of interest for bounding boxes using the tags.

Once the extraction processor 110 detects the objects of interest and creates the associated bounding boxes for a check image, the check fraud detection system 102 operates to send the check image to the check database 106 via the network 104, so the check image can be stored for later use. Therefore, the object detection processor 112 only needs to detect object positions and create bounding boxes once for a check in some embodiments, because the check fraud detection system 102 can operate to retrieve the check image with the detected object positions and created bounding boxes from the check database 106.

Additionally, the extraction processor 110 operates to convert the check images back to the original format and/or the original size before the check fraud detection system 102 sends the check image to the check database 106, and/or the extraction processor 110 operates to send a copy of the check image in the original size and/or the original format. In certain embodiments, converting the check images includes mapping, by the extraction processor 110, the detected objects of interest and/or bounding boxes to the check image that is converted back to the original format and/or the original size. The extraction processor 110 can operate to convert the check images so the check images have a higher resolution, the check images are stored in a format for the comparison processor 114 and/or the check database 106 can use, and the like. For example, the extraction processor 110 originally sizes a check image to be used by the object detection processor 112 with a lower resolution, and the lower resolution image may be sized so that logos, designs, and other objects of interest lose detail. The comparison processor 114 may operate more effectively with more detail to compare logos, designs, and/or other objects of interest. Thus, the extraction processor 110 can operate to resize the check image so the image has a higher resolution, such as the resolution the check image had when the check image was submitted.

The object detection processor 112 operates to identify objects of interest and create bounding boxes when a check is initially submitted, when a check is needed for the fraud detection analysis, and the like. For example, a reference check image can be a check image that was previously submitted and determined to be valid. Thus, if the reference check image is used for the check fraud detection process, the reference check image may have been processed by the extraction processor 110 and the object detection processor 112 when the reference check was received. Therefore, when the check fraud detection system 102 retrieves the reference check image from the check database 106, the reference check image already includes the detected objects of interest and/or the associated bounding boxes. In another example, an image of a check that is known to be valid is stored in the check database 106 without being processed by the extraction processor 110 and/or the object detection processor 112. In this example, if the valid check is used as a reference check for the check fraud detection process, the object detection processor 112 operates to detect objects of interest on the check and create bounding boxes associated with the objects of interest before the valid check image is used for the check fraud detection process. In some embodiments, the valid check image is updated in the check database 106 to include the detected objects of interest and/or the bounding boxes. In certain embodiments, the valid check image is replaced or otherwise updated in the check database 106 to include the detected objects of interest and/or the bounding boxes.

The comparison processor 114 operates to perform an image pattern comparison, an object of interest overlap comparison, and/or a signature comparison. In example embodiments, the image pattern comparison includes the comparison processor 114 comparing the objects of interest of the incoming check image to the objects of interest of one or more reference check images. For example, the incoming check includes a logo, as indicated by a detected object of interest and/or created bounding box from the object detection processor 112. The comparison processor 114 operates to compare the logo of the incoming check image to the logo of the one or more reference check images to determine whether the logo of the incoming check is the same or substantially the same logo as the logo present on the one or more reference check images. The comparison processor 114 can operate to compare the portion of the incoming check image defined by the logo bounding box to the portion of the one or more reference check images defined by the logo bounding box of the reference check images. The comparison processor 114 determines and/or adjusts an image pattern score based on the comparison of the objects of interest. The image pattern score is a value that indicates a confidence level that an incoming check is valid based on the comparison of the incoming check image objects of interest to one or more reference check image objects of interest. Thus, the image pattern score indicates an overall confidence level that the incoming check stock image and the reference check stock image match or are otherwise consistent.

In certain embodiments, the image pattern comparison also include a check stock comparison, and the comparison processor 114 compares the incoming check background to a stock check. The check database 106 can store check stock images and/or the extraction processor 110 can create check stock images. For example, the check database 106 stores blank check images and/or other images used as check stock images. In some embodiments, the check database 106 is associated with one or more financial entities, so the check stock images can be stored by the one or more financial entities in the check database 106. In another example, the extraction processor 110 creates a check stock image for a customer using one or more previously submitted check images. The extraction processor 110 operates to use the bounding boxes created by the object detection processor 112 to exclude or otherwise clear portions of the check image from the check stock image being created, such as variable objects of interest. The variable objects of interest may be objects of interest that can vary between checks, such as the information (e.g., argument, value, appearance) for the signature line, the date line, the amount line, and/or the MICR line. In some embodiments, the check fraud detection system 102 operates to send created check stock images to the check database 106 to be stored.

The extraction processor 110 can also operate to create an incoming check stock image with the variable objects of interest removed from the incoming check image for the comparison processor 114 to perform the comparison with the reference check stock image. The comparison processor 114 operates to input the incoming check stock image and the reference check stock image into a machine learning algorithm to perform the check stock comparison. The machine learning algorithm may be a deep learning algorithm, neural networks, multimodal transformers, contrastive learning, and the like. For example, the machine learning algorithm may be a Convolutional Neural Network (CNN) based contrastive learning model or a convolutional or multimodal transformer neural network. The comparison processor 114 operates to use the machine learning algorithm to generate higher dimension representations of the incoming check stock image and the reference check stock image, and the comparison processor 114 uses the higher dimension representations to determine the Euclidean distance between the incoming check stock image and the reference check stock image. In some embodiments, the comparison processor 114 compares the determined Euclidean distance to a threshold to determine whether the incoming check stock image and the reference check stock image are a match or otherwise consistent. In another example, the comparison processor 114 determines and/or adjusts the image pattern score based on comparing the determined Euclidean distance to a threshold.

In certain embodiments, the object of interest overlap comparison includes the comparison processor 114 analyzing whether the detected objects of interest of the incoming check and the one or more reference checks overlap, by using, for example, a Jaccard Index, also referred to as an Intersection over Union (IoU) metric. The comparison processor 114 operates to use the bounding boxes associated with the detected objects of interest to perform the object overlap comparison. For example, the comparison processor 114 determines the bounding boxes for the object of interests to be analyzed using the tags the extraction processor 110 created and then performs the object overlap comparison using the bounding boxes. In certain embodiments, determining the IoU metric includes determining the area of overlap and the area of union between the bounding box of the incoming check image and the bounding box of a reference check image. The comparison processor 114 can then operate to divide the area of overlap by the area of union to determine the IoU metric. The IoU metric is a value between zero and one, with a value of zero indicating that the bounding boxes do not overlap at all and a value of one indicating that the bounding boxes overlap perfectly. The comparison processor 114 operates to determine and/or adjust an IoU score based on determined IoU metrics. The IoU score indicates a confidence level that the incoming check is valid based on the IoU metrics. The comparison processor 114 can operate to determine IoU metrics for any number of objects of interest, each object of interest detected by the object detection processor 112 for example. Thus, the IoU score may be based on the determined IoU metric for each object of interest.

In example embodiments, the signature comparison includes the comparison processor 114 comparing the signature of the incoming check with one or more reference signatures. The comparison processor 114 operates to identify the signature of the incoming check using the detected object of interest, created bounding box, and/or tag associated with the signature line from the object detection processor 112. The extraction processor 110 and/or the comparison processor 114 can extract the signature from the incoming check image. In certain embodiments, the reference signatures are stored in the check database 106 and/or are retrieved from one or more reference check images stored in the check database 106.

The comparison processor 114 can operate to compare the signature of the incoming check and the reference signatures using a machine learning algorithm, such as the algorithm described above used to perform the check stock comparison. For example, the comparison processor 114 uses a CNN based contrastive learning model to compare the signature of the incoming check and the reference signatures and determine a signature score. The signature score indicates a confidence level that the signature of the incoming check is valid.

The recognition processor 116 operates to identify the date and/or the amount on the check to determine if a check is expired, if the check has been submitted previously, if the amount on the check anomalous, and the like. The recognition processor 116 can operate to determine the location of the date and/or the amount on the check image using the detected objects of interest, created bounding boxes, and/or tags from the object detection processor 112. In some embodiments, the recognition processor 116 uses Optical Character Recognition (OCR) and/or another character recognition process to identify the date, the amount on the check, and/or other textual information such as logos, notary stamps, payee information, and payer information.

The check submission system 108 operates to receive input indicating the date and/or amount from a user that submits the incoming check image. The recognition processor 116 can compare the identified data and/or amount from the incoming check image to the received input indicating the date and/or amount to determine if the date and/or the amount are correct. Additionally, the check database 106 can store check history for the user associated with the incoming check image. In some embodiments, the recognition processor 116 operates to compare the identified date and/or amount from the incoming check image to the check history to determine if the incoming check image is associated with a previously submitted check and/or the amount is anomalous. Thus, the recognition processor can check for double presentment, anomalous amounts, and/or correct dates and amounts. The recognition processor 116 operates to determine and/or update a double presentment score based on the comparison between the identified date and/or amount from the incoming check image to the check history. The double presentment score is a value that indicates the confidence that the incoming check has not been submitted previously.

In certain embodiments, the recognition processor 116 identifies the payee name and/or the payer name on the check. The recognition processor 116 can operate to compare the identified names to the expected names to determine if the incoming check has been correctly submitted.

The check fraud detection system 102 operates to generate a check fraud score based on the operations and determinations of the extraction processor 110, the object detection processor 112, the comparison processor 114, and/or the recognition processor 116. The check fraud score is based on the IoU score, the image pattern score, the signature score, and/or the double presentment score. The check fraud detection system 102 can assign weights to the IoU score, the image pattern score, the signature score, and/or the double presentment score so the scores can have a lesser or greater influence on the overall check fraud score. For example, the IoU score is assigned a weight of 1, the image pattern score is assigned a weight of 1, the signature score is assigned a weight of 0.75, and the double presentment score is assigned a weight of 0.5. In this example, the IoU score and the image pattern score impact the check fraud score the most, the signature score impacts the check fraud score less than the IoU score and the image pattern score and more than the double presentment score, and the double presentment score impacts the check fraud score the least. Based on the check fraud score, the check fraud detection system 102 can operate to either approve the incoming check or flagged the incoming check as a suspected fraudulent check. When the check fraud detection system 102 flags the incoming check, the incoming check can be sent to another system for review. For example, the check fraud detection system 102 send the incoming check image to a computing device for a user to manually review the incoming check to determine if the incoming check is fraudulent.

Figure 2:
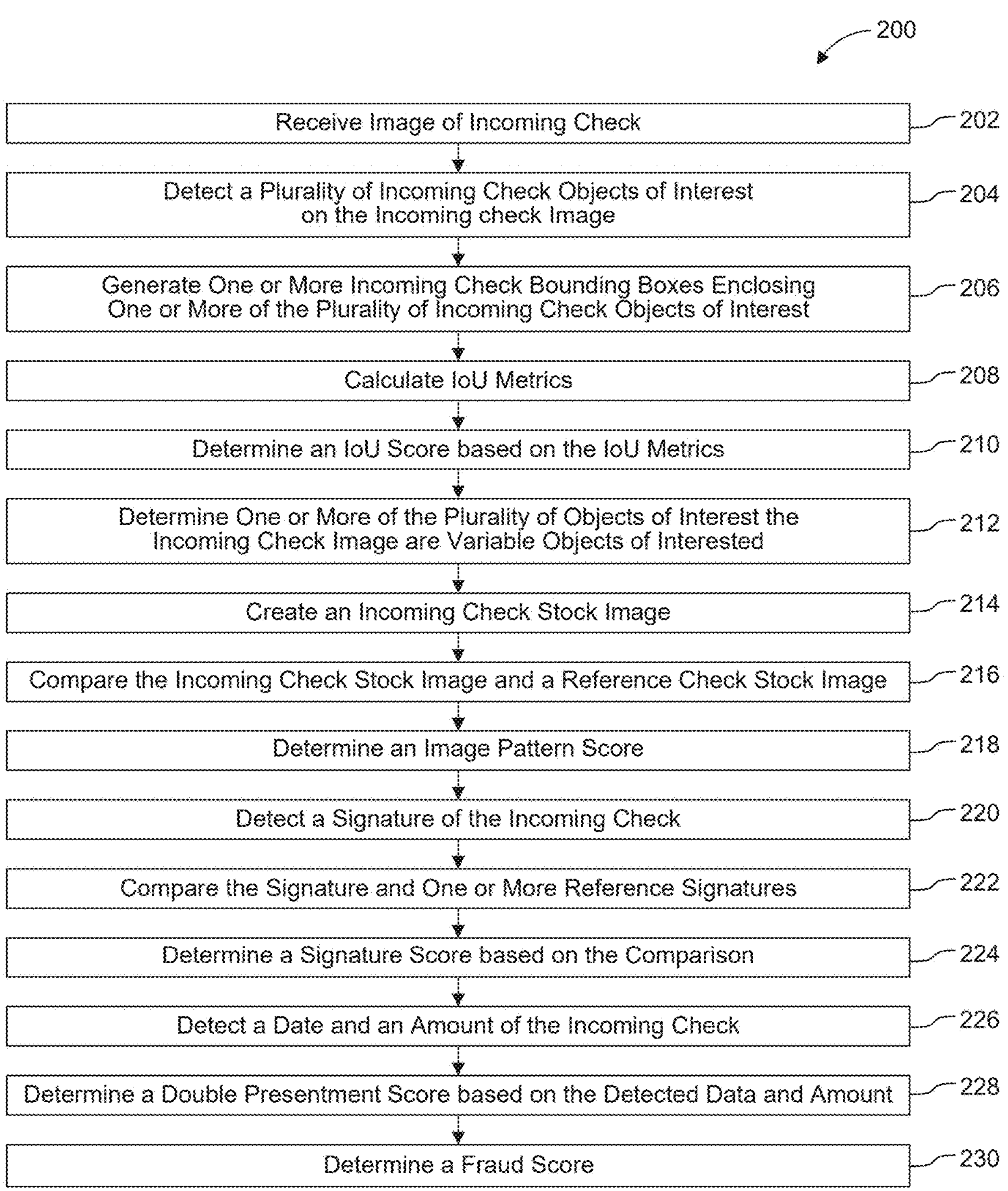
FIG. 2 is a flowchart of a method for providing check fraud detection according to an example.

FIG. 2 is a flowchart of a method 200 for providing check fraud detection according to an example. The method 200 begins at operation 202, and an image of an incoming check is received. For example, the check fraud detection system 102 receives the incoming check image. In operation 204, a plurality of incoming check objects of interest on the incoming check image are detected. For example, the extraction processor 110 performs any of the operations described above with respect to FIG. 1 to process the incoming check image for the object detection processor 112. The object detection processor 112 then operates to detect the objects of interest.

In operation 206, one or more incoming check bounding boxes enclosing one or more of the plurality of incoming check objects of interest are generated. For example, the object detection processor 112 generates or otherwise creates bounding boxes enclosing the objects of interest detected in operation 204. In some embodiments, the extraction processor 110 again processes the incoming check image to resize the incoming check image to the original size and/or change the incoming check image format to the original format. The extraction processor 110 can also operate to map the determined bounding boxes to the resized incoming check image that has its original size.

In operation 208, IoU metrics for the one or more incoming check bounding boxes and one or more reference check bounding boxes enclosing one or more corresponding objects on a reference check are determined. For example, the comparison processor 114 determines the IoU metrics for each bounding box of the incoming check image determined in operation 206. The comparison processor 114 can perform any of the operations described above with respect to FIG. 1 to determine the IoU metrics. In operation 210, an IoU score is determined based on the IoU metrics. For example, the comparison processor 114 determines the IoU score based on the IoU metrics determined in operation 208.

In operation 212, one or more of the plurality of objects of interest of the incoming check image are determined to be variable objects of interest. For example, the object detection processor 112 and/or the comparison processor 114 determines one or more of the objects of interest determined in operation 204 are variable objects of interest. In operation 214, an incoming check stock image is created. For example, the extraction processor 110 creates an incoming check stock image, wherein the incoming check stock image excludes the variable objects of interest determined in operation 212.

In operation 216, the incoming check stock image and a reference check stock image are compared. For example, the comparison processor 114 compares the incoming check stock image created in operation 214 and the reference check stock image. In an example implementation, the comparison processor 114 uses a machine learning algorithm, such as one of the machine learning algorithms described above, to perform the comparison. In operation 218, an image pattern score is determined based on the comparison of the incoming check stock image and the reference check stock image. For example, the comparison processor 114 determines the image pattern score.

In operation 220, a signature of the incoming check is detected. For example, the comparison processor 114 detects the signature of the incoming check. In operation 222, the signature of the incoming check and one or more reference signatures are compared. For example, the comparison processor 114 compares the signature of the incoming check and the one or more reference signatures using the machine learning algorithm. In operation 224, a signature score is determined, by the comparison processor 114 for example, based on the comparison in operation 222.

In operation 226, a date and an amount of the incoming check is detected. For example, the recognition processor 116 detects the date and the amount using character recognition. In operation 228, a double presentment score is determined based on the detected date and amount. For example, the recognition processor 116 determines the double presentment score may compare the detected data and amount to a check history retrieved from the check database 106 to determine the double presentment score.

In operation 230, a fraud score is determined. For example, the check fraud detection system 102 determines the fraud score based on the IoU score, the image pattern score, the signature score, and/or the double presentment score.

Figure 3:
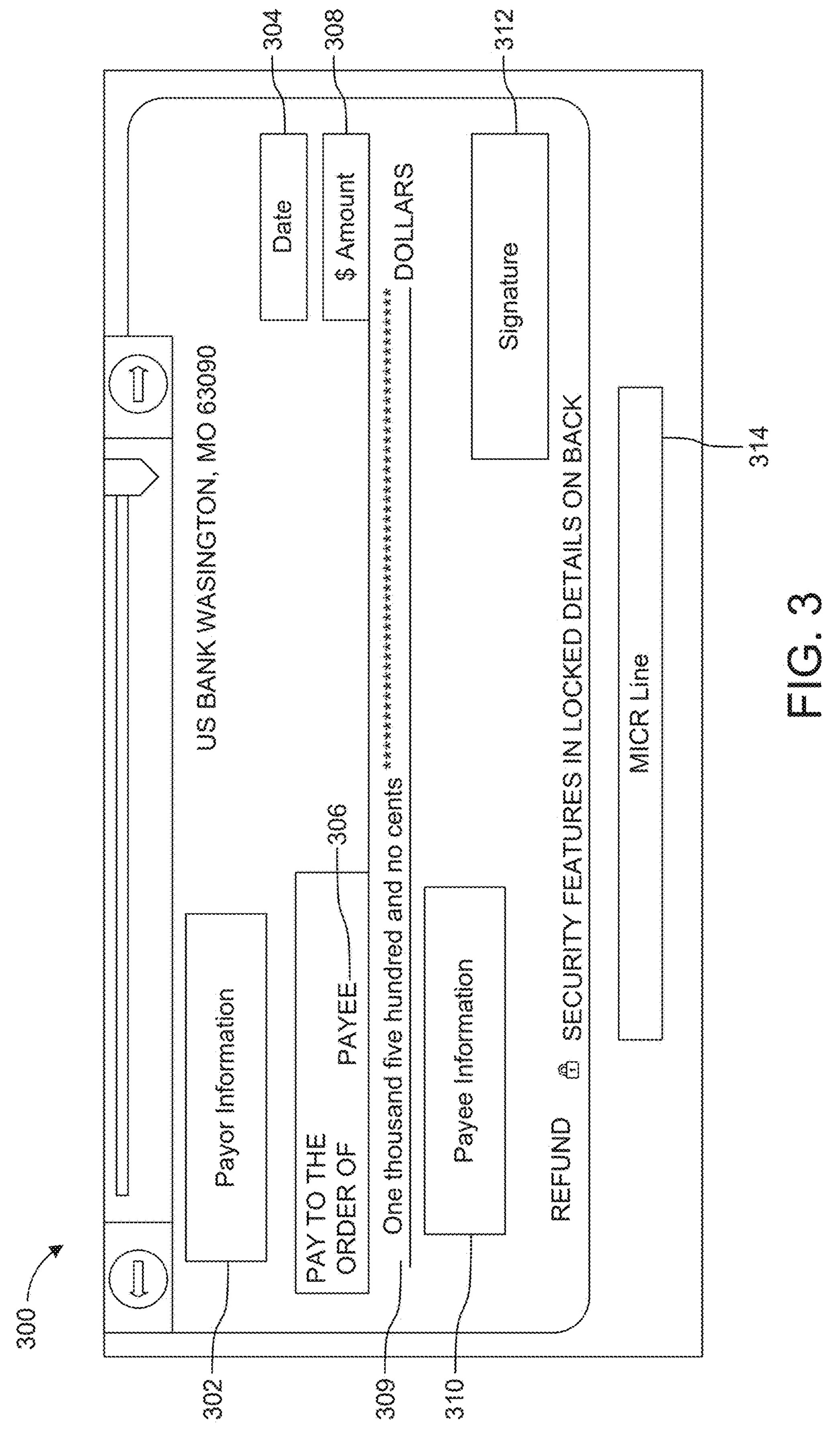
FIG. 3 is a diagram of an incoming check image according to an example.

FIG. 3 is a diagram of an incoming check image 300 according to an example. The incoming check image 300 includes objects of interest, including variable objects of interest that have variable values and/or appearances for different checks. For example, the objects of interest include a payer line 302, date line 304, a payee line 306, an amount box 308, an amount line 309, payee information 310, a signature 312, and a MICR line 314. The check fraud detection system 102 may determine the date line 304 is a variable object of interest because the date line 304 varies based on the date the check is filled out, the payee line 306 and the payee information 310 are variable objects of interest because the payee line 306 and the payee information 310 vary based on the person or entity the check is for, the amount box 308 and the amount line 309 are variable objects of interest because the amount box 308 and the amount line 309 vary based on the monetary amount the check is for, the signature 312 is a variable object of interest because of the differences in the signature the signer makes when signing the check, and/or the MICR line 314 is a variable object of interest because the MICR line 314 varies based on the characters that identify the check. The check fraud detection system 102 may also determine the payer information 302 is a variable object of interest because the payer information 302 may vary based on the identity of the person writing the check. For example, multiple people can use the same check stock issued by a financial entity, so the check fraud detection system 102 can identify the payer information 302 as a variable object of interest.

When the check fraud detection system receives the incoming check image 300, the extraction processor 110, the object detection processor 112, the comparison processor 114, and/or the recognition processor 116 may operate to perform any of the operations described above with respect to FIG. 1 and FIG. 2. For example, the object detection processor 112 detects the objects of interest, such as the payer information 302, the date line 304, the payee line 306, the amount box 308, the amount line 309, the payee information 310, the signature 312, and/or the MICR line 314, and the object detection processor 112 creates associated bounding boxes and/or tags. The object detection processor 112 also determines which objects of interest are variable objects of interest in certain embodiments. The comparison processor 114 can then perform the image pattern comparison, the signature comparison, the check stock comparison, and/or the object of interest overlap comparison. Additionally, the recognition processor 116 can perform the double presentment comparison.

Figure 4:
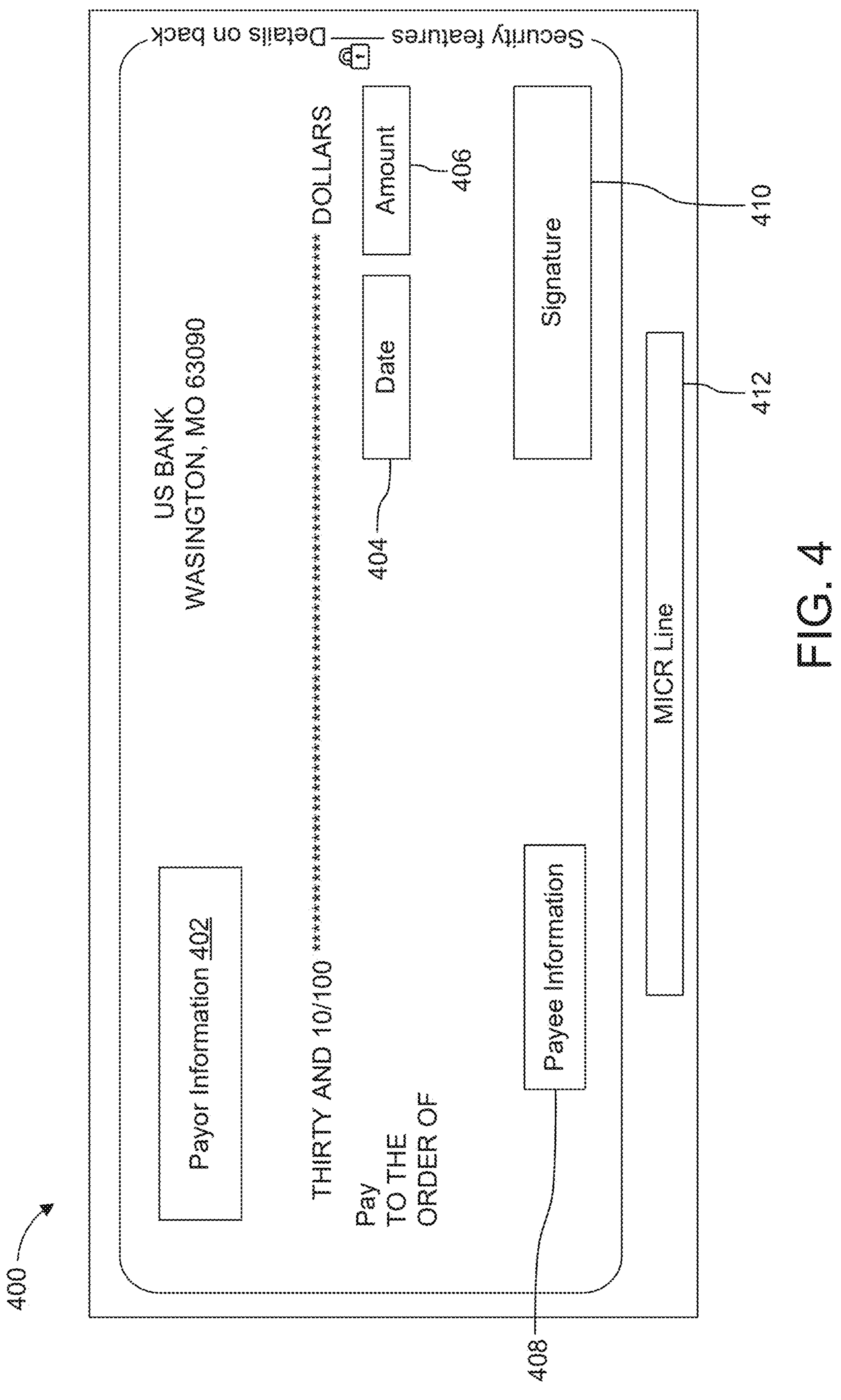
FIG. 4 is a diagram of a reference check image according to an example.

FIG. 4 is a diagram of a reference check image 400 according to an example. The reference check image 400 includes objects of interest such as payer information 402, a date line 404, an amount line 406, payee information 408, a signature 410, and a MICR line 412. The reference check image 400 can include bounding boxes for the payer information 402, the date line 404, the amount line 406, the payee information 408, the signature 410, and/or the MICR line 412. The reference check image 400 may also identify, with tags for example, which objects of interest are variable objects of interest.

Figure 5:
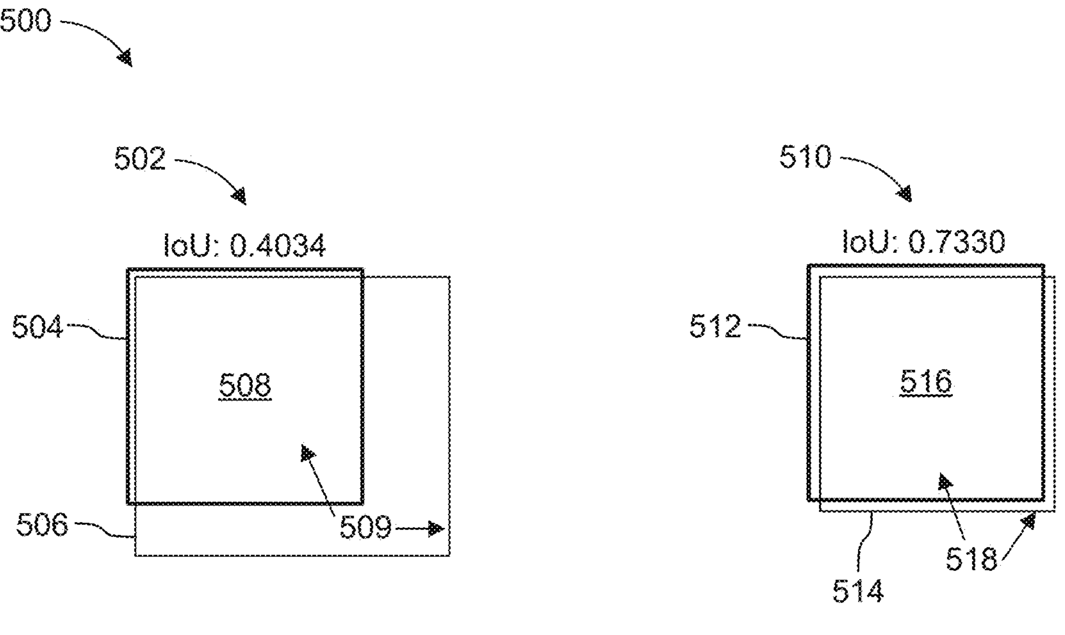
FIG. 5 is a diagram of an Intersection over Union metric determination according to an example.
Figure 5:
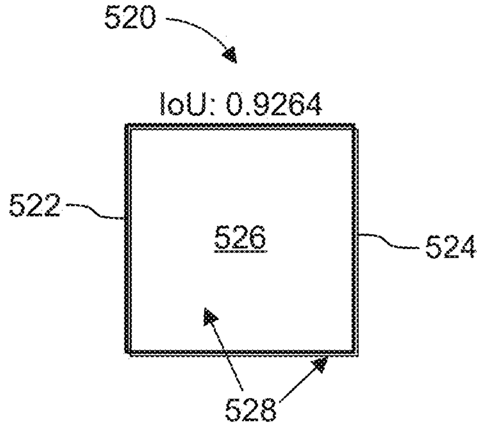

FIG. 5 is a diagram of an IoU metric determination 500 according to an example. The IoU metric determination 500 includes a first object of interest IoU metric determination 502, a second object of interest IoU metric determination 510, and a third object of interest IoU metric determination 520. In example implementations, the check fraud detection system 102 determines IoU metrics by determining the area of overlap over the the area of union between the bounding box of the incoming check image and the bounding box of a reference check image. The comparison processor 114 may then divide the area of overlap by the area of union to determine the IoU metric. Thus, the IoU metric is a value between zero and one, with a value of zero indicating that the bounding boxes do not overlap at all and a value of one indicating that the bounding boxes overlap perfectly.

The first object of interest IoU metric determination 502 is a comparison of a first incoming check object of interest 504 and a first reference check object of interest 506. In example implementations, the comparison processor 114 determines the first object of interest IoU metric determination 502 by dividing the area of overlap 508 over the area of union 509. The area of overlap 508 may be the area where the first incoming check object of interest 504 and the first reference check object of interest 506 overlap. The area of union 509 is the area of the total shape created by overlapping the first incoming check object of interest 504 and the first reference check object of interest 506. The comparison processor 114 operates to determine the IoU metric for the first object of interest IoU metric determination 502 equals 0.4. The value of 0.4 may indicate that the first incoming check object of interest 504 and the first reference check object of interest 506 have a poor overlap, and the comparison processor can operate create and/or adjust the IoU score to indicate a lower confidence that the incoming check is valid. In some embodiments, the comparison processor 114 compares IoU metrics to a threshold to determine if an IoU metric should be used to adjust the IoU score to indicate a lower, a same or otherwise neutral, or a higher confidence that the incoming check is valid.

Similarly, the second object of interest IoU metric determination 510 is a comparison of a second incoming check object of interest 512 and a second reference check object of interest 514. In example implementations, the comparison processor 114 determines the second object of interest IoU metric determination 510 by dividing the area of overlap 516 over the area of union 518. The comparison processor 114 operates to determine the IoU metric for the second object of interest IoU metric determination 510 equals 0.7. The value of 0.7 may indicate that the second incoming check object of interest 512 and the second reference check object of interest 514 have a neutral overlap, and the comparison processor can operate to create and/or adjust the IoU score to indicate a neutral confidence that the incoming check is valid.

The third object of interest IoU metric determination 520 is a comparison of a third incoming check object of interest 522 and a third reference check object of interest 524. In example implementations, the comparison processor 114 determines the third object of interest IoU metric determination 520 by dividing the area of overlap 526 over the area of union 528. The comparison processor 114 operates to determine the IoU metric for the second object of interest IoU metric determination 510 equals 0.9. The value of 0.9 may indicate that the second incoming check object of interest 512 and the second reference check object of interest 514 have a positive overlap, and the comparison processor can operate to create and/or adjust the IoU score to indicate a more positive confidence that the incoming check is valid.

Figure 6:
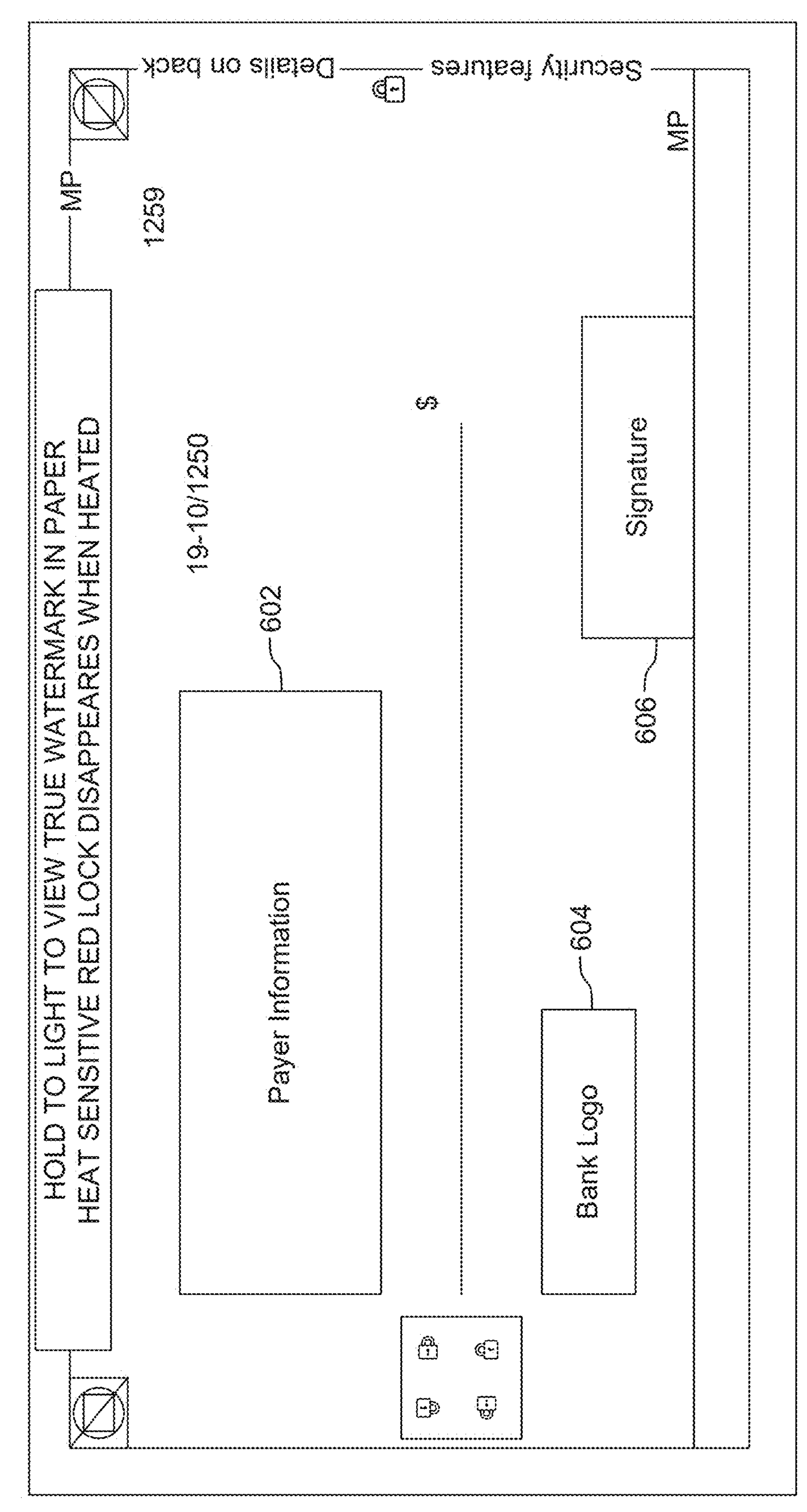
FIG. 6 is a diagram of a stock check according to an example.

FIG. 6 is a diagram of a stock check image 600 according to an example. The stock check image 600 includes payer information 602, a bank logo 604, and a signature line 606. The stock check image 600 may have variable objects of interest removed for the comparison processor to use to compare the stock check image 600 with an incoming stock check image.

Figure 7:
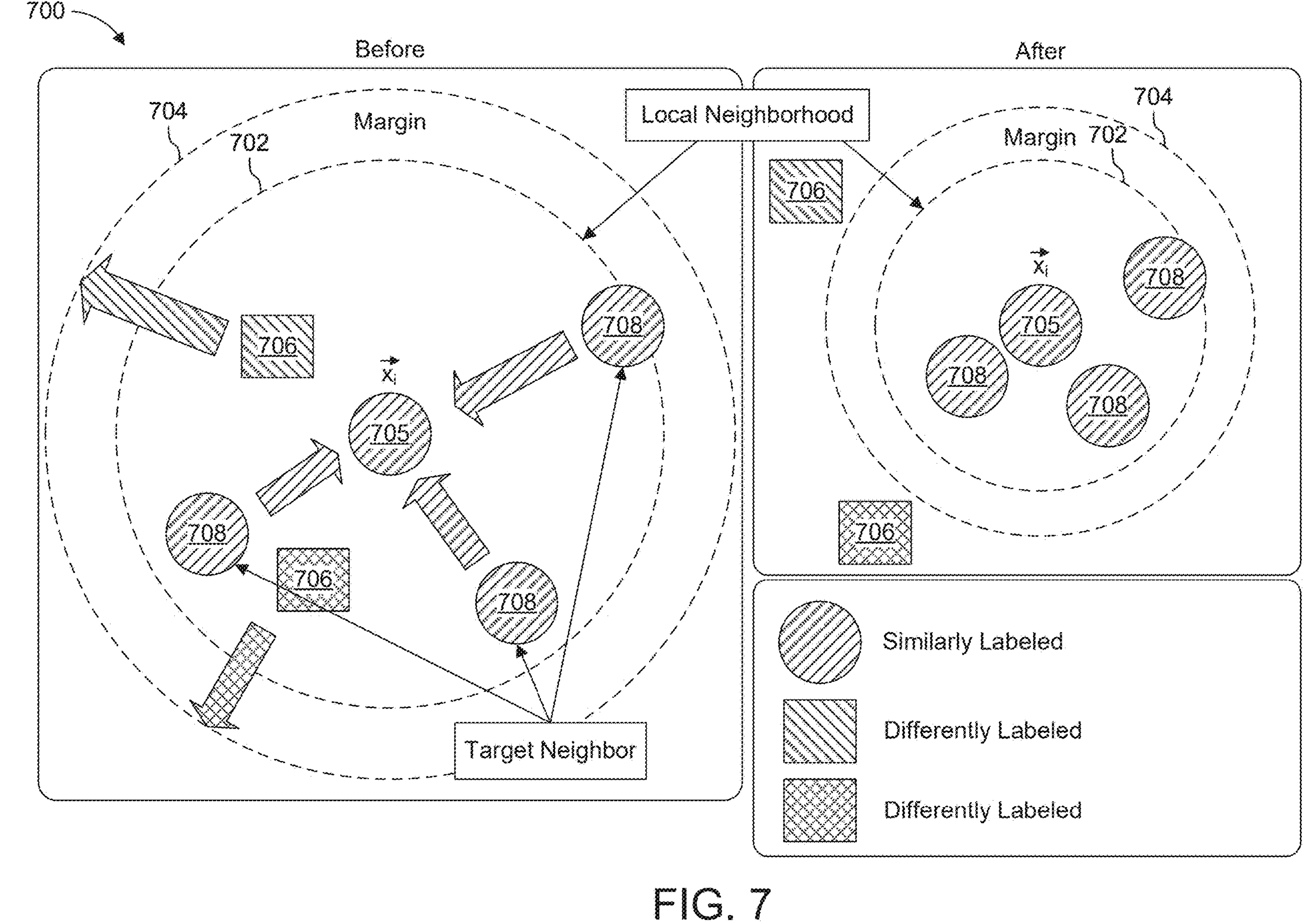
FIG. 7 is a diagram of a contrastive learning determination according to an example.

FIG. 7 is a diagram of a contrastive learning determination 700 according to an example. The contrastive learning determination 700 may be a visual representation of the operation of the machine learning algorithm described above with respect to FIG. 1. For example, the machine learning algorithm is a CNN based contrastive learning model, and the machine learning algorithm compares an incoming check stock with one or more reference check stocks or an incoming check signature with one or more reference signatures. In some embodiments, the contrastive learning determination includes a target area 702, a margin area 704, a reference hash 705, dissimilar hashes 706, and similar hashes 708. The target area 702 is the area the machine learning algorithm moves similar hashes, such as the similar hashes 708, within. The margin area 704 is an area the machine learning algorithm moves dissimilar hashes, such as the dissimilar hashes 706, outside of and/or may move hashes that the machine learning algorithm cannot determine are similar or dissimilar to. The reference hash 705 is the reference the machine learning algorithm uses to determine the target area 702 and/or the margin area 704.

When the machine learning algorithm compares check stocks, the check fraud detection system 102 can train the machine learning algorithm to create hashes in a manner that have close Euclidean distance or cosine similarity between checks from the same check stock and a large Euclidean distance or cosine similarity for checks from different check stocks and/or altered check stocks. For example, check stocks that are similar, such as check stocks represented by the similar hashes 708, are moved to be within the target area 702. Check stocks that are dissimilar, such as check stocks represented by the dissimilar hashes 706, are moved outside of the margin area 704.

Similarly, when the machine learning algorithm is comparing signatures, the check fraud detection system 102 can operate to train the machine learning algorithm to create hashes in a manner that have close Euclidean distance or cosine similarity between valid signatures and a large Euclidean distance or cosine similarity for signatures that are not valid. For example, signatures that are similar, such as signatures represented by the similar hashes 708, are moved to be within the target area 702. Signatures that are dissimilar, such as signatures represented by the dissimilar hashes 706, are moved outside of the margin area 704.

When the machine learning algorithm is comparing check stocks, the comparison processor 114 can operate to use the machine learning algorithm to create a target hash, such as the reference hash 705, based on the reference check stock images. The comparison processor can also use the machine learning algorithm to create an incoming hash based on the incoming check stock image. The comparison processor 114 operates to calculate the Euclidean distances or cosine similarity between the target hash and the incoming hash. For example, the incoming hash is represented by a similar hash 708. In this example, the Euclidean distance indicates that the incoming hash is within the target area 702, and the incoming check stock therefore indicates the incoming check is valid. In another example, the incoming hash is represented by a dissimilar hash 706. In this example, the Euclidean distance indicates the incoming hash is not within the target area 702, and the incoming check stock therefore indicates the incoming check is not valid.

When the machine learning algorithm is comparing signatures, the comparison processor 114 can operate to use the machine learning algorithm to create a target hash, such as the reference hash 705, based on the reference signatures. The comparison processor 114 can use the machine learning algorithm to create an incoming hash based on the incoming signature. The comparison processor 114 operate to calculate the Euclidean distances or cosine similarity between the target hash and the incoming hash. For example, the incoming hash is represented by a similar hash 708. In this example, the Euclidean distance indicates that the incoming hash is within the target area 702, and the incoming signature therefore indicates the incoming check is valid. In another example, the incoming hash is represented by a dissimilar hash 706. In this example, the Euclidean distance indicates the incoming hash is not within the target area 702, and the incoming signature therefore indicates the incoming check is not valid.

Thus, the machine learning algorithm can operate to create a signature hash model and/or a check stock hash model with a signature data point, populate the models with data points representing the signature or the check stock of the incoming check and the one or more reference signatures or check stocks, determine the distances of the data points representing the signature or the check stock of the incoming check and the one or more reference signatures or check stocks from the target signature data point, determine a target distance from the target signature or check stock data point based on the distances of the data points representing the one or more reference signatures or check stocks from the target signature or check stock data point, compare the distance of the data point representing the signature or the check stock of the incoming check and the target distance and determine a signature or check stock similarity of the incoming check based on the comparison. In some embodiments, contrastive learning is used to compare the handwriting profiles of reference checks and/or other test checks.

In some embodiments, the present disclosure includes a computer program product which is a non-transitory storage medium or computer-readable medium (media) having instructions stored thereon/in which can be used to program a computer to perform any of the processes of the present. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Examples of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

What is claimed is:

1. A method for detecting fraudulent documents, the method comprising:
- receiving a document image associated with a document;
- processing the document image to generate a processed document image for fraud detection, including:
  - converting the document image to a format the same as reference documents to avoid, during an object detection processing, object detection issues caused by a format difference between the reference documents and the document image, and
  - resizing the document image to predetermined lower resolution dimensions to avoid object detection issues during the object detection processing;
- detecting a plurality of document objects of interest on the processed document image using the object detection processing;
- determining coordinates of the plurality of document objects of interest in the processed document image;
- generating one or more document bounding boxes enclosing one or more of the plurality of document objects of interest;
- reconverting the processed document image back into original resolution dimensions after the one or more bounding boxes are generated to locate the objects of interest in the document image;
- calculating Intersection over Union (IoU) metrics for the one or more document bounding boxes and one or more reference document bounding boxes enclosing one or more corresponding reference document objects of interest on a reference document, wherein the calculating is based on the one or more document bounding boxes on the reconverted processed document image to enable accurate comparison of the objects of interest for fraud detection;
- determining an IoU score based on the IoU metrics;
- determining a fraud score based on the IoU score; and either:
  - determining the document is valid based on the fraud score and approving the document; or
  - determining the document exhibits an indication of invalidity based on the fraud score and flagging the document.

2. The method of claim 1, further comprising:
- determining one or more of the plurality of document objects of interest are variable objects of interest in the document image;
- creating a document stock image that excludes the variable objects of interest;
- comparing the document stock image and a reference document stock image using an algorithm; and
- determining an image pattern score based on the comparison of the document stock image and the reference document stock image,
- wherein determining the fraud score is based on the image pattern score.

3. The method of claim 2, wherein the algorithm:
- creates hashes in a manner that have close Euclidean distance or cosine similarity between documents from the same document stock and a large Euclidean distance or cosine similarity for documents from different document stocks or altered document stock.

4. The method of claim 3, wherein comparing the document stock image and the reference document stock image using the algorithm includes:
- using the algorithm to create and store a target hash based on the reference document stock image;
- using the algorithm to create a hash based on the document stock image; and
- calculating any one of (i) Euclidean distances between the target hash and the hash, (ii) a cosine similarity between the target hash and the hash, or (iii) a combination of (i) and (ii).

5. The method of claim 1, further comprising:
- detecting a signature of the document;
- comparing the signature of the document and one or more reference signatures using an algorithm; and
- determining a signature score based on the comparison of the signature of the document and the one or more reference signatures, wherein determining the fraud score is based on the signature score.

6. The method of claim 5, wherein comparing the signature of the document and the one or more reference signatures using the algorithm includes:
- creating a signature hash model with a target signature data point;
- populating the signature hash model with data points representing the signature of the document and the one or more reference signatures;
- determining the distances of the data points representing the signature of the document and the one or more reference signatures from the target signature data point;
- determining a target distance from the target signature data point based on the distances of the data points representing the one or more reference signatures from the target signature data point;

comparing the distance of the data point representing the signature of the document and the target distance; and determining a signature similarity of the signature of the document based on the comparison of the distance of the data point representing the signature of the document and the target distance.

7. The method of claim 6, wherein comparing the signature of the document and the one or more reference signatures includes:

using the algorithm to create and store a target hash based on the one or more reference signatures;

using the algorithm to create a hash based on the signature of the document; and calculating any one of (i) Euclidean distances between the target hash and the hash, (ii) a cosine similarity between the target hash and the hash, or (iii) a combination of (i) and (ii).

8. A method for detecting document fraud, the method comprising:

receiving a document image associated with a document;

processing the document image to generate a processed document image for fraud detection, including:

converting the document image to a format the same as reference documents to avoid, during an object detection processing, object detection issues caused by a format difference between the reference documents and the document image, and resizing the document image to predetermined lower resolution dimensions to avoid object detection issues during the object detection processing;

detecting a plurality of document objects of interest on the document image using the object detection processing;

determining one or more of the plurality of document objects of interest are variable objects of interest in the document image;

creating a document stock image based on the one or more of the plurality of document objects of interest, wherein the document stock image excludes the variable objects of interest;

generating one or more document bounding boxes enclosing one or more of the plurality of document objects of interest;

reconverting the processed document image back into original resolution dimensions after the one or more bounding boxes are generated to locate the objects of interest in the document image;

calculating Intersection over Union (IoU) metrics for the one or more document bounding boxes and one or more reference document bounding boxes enclosing one or more corresponding reference document objects of interest on a reference document;

determining an IoU score based on the IoU metrics, wherein the calculating is based on the one or more document bounding boxes on the reconverted processed document image to enable accurate comparison of the objects of interest for fraud detection;

comparing the document stock image and a reference document stock image;

determining an image pattern score based on the comparison of the document stock image and the reference document stock image; and determining a fraud score based on (1) the IoU score and (2) the image pattern score.

9. The method of claim 8, further comprising:

determining the document is valid based on the fraud score; and approving the document.

10. The method of claim 8, further comprising saving the document as a new reference document.

11. The method of claim 8, further comprising:

determining the document requires review based on the fraud score; and flagging the document.

12. The method of claim 8, wherein comparing the document stock image and the reference document stock image includes:

creating hashes of the document stock image and the reference document in a manner that have close Euclidean distance or cosine similarity between documents from the same document stock and a large Euclidean distance or cosine similarity for documents from different document stocks or altered document stock.

13. The method of claim 8, wherein comparing the document stock image and the reference document stock image includes:

creating and storing a target hash based on the reference document stock image;

creating a hash based on the document stock image; and calculating any one of (i) Euclidean distances between the target hash and the hash, (ii) a cosine similarity between the target hash and the hash, or (iii) a combination of (i) and (ii).

14. A method for detecting document fraud, the method comprising:

receiving a document image associated with a document;

processing the document image to generate a processed document image for fraud detection, including:

converting the document image to a format the same as reference documents to avoid, during an object detection processing, object detection issues caused by a format difference between the reference documents and the document image, and resizing the document image to predetermined lower resolution dimensions to avoid object detection issues during the object detection processing;

detecting a plurality of document objects of interest on the processed document image using the object detection processing;

generating one or more document bounding boxes enclosing one or more of the plurality of document objects of interest;

reconverting the processed document image back into original resolution dimensions after the one or more bounding boxes are generated to locate the objects of interest in the document image;

calculating Intersection over Union (IoU) metrics for the one or more document bounding boxes and one or more reference document bounding boxes enclosing one or more corresponding reference document objects of interest on a reference document, wherein the calculating is based on the one or more document bounding boxes on the reconverted processed document image to enable accurate comparison of the objects of interest for fraud detection;

determining an IoU score based on the IoU metrics;

detecting a signature of the document;

comparing the signature of the document and one or more reference signatures;

determining a signature score based on the comparison of the signature of the document and the one or more reference signatures; and determining a fraud score based on (1) the IoU score and (2) the signature score.

15. The method of claim 14, further comprising:

determining the document is valid based on the fraud score and approving the document; or determining that the document exhibits an indication of invalidity based on the fraud score and flagging the document.

16. The method of claim 14, wherein reconverting the processed document image back into the original resolution dimensions comprises:

determining coordinates of the plurality of document objects of interest in the processed document image; and mapping the one or more document bounding boxes based on the coordinates.

17. The method of claim 14, further comprising:

determining one or more of the plurality of document objects of interest are variable objects of interest in the document image;

creating a document stock image, wherein the document stock image excludes the variable objects of interest;

comparing the document stock image and a reference document stock image; and determining an image pattern score based on the comparison of the document stock image and the reference document stock image, wherein determining the fraud score is based on the image pattern score.

18. The method of claim 17, wherein comparing the document stock image and the reference document stock image includes:

creating a target hash based on the reference document stock image;

creating a hash based on the document stock image; and calculating any one of (i) Euclidean distances between the target hash and the hash, (ii) a cosine similarity between the target hash and the hash, or (iii) a combination of (i) and (ii).

19. The method of claim 14, wherein comparing the signature of the document and the one or more reference signatures includes:

creating a signature hash model with a target signature data point;

populating the signature hash model with data points representing the signature of the document and the one or more reference signatures;

determining the distances of the data points representing the signature of the document and the one or more reference signatures from the target signature data point;

determining a target distance from the target signature data point based on the distances of the data points representing the one or more reference signatures from the target signature data point;

comparing the distance of the data point representing the signature of the document and the target distance; and determining a signature similarity of the signature of the document based on the comparison of the distance of the data point representing the signature of the document and the target distance.

20. The method of claim 14, further comprising saving the document as a new reference document.

* * * * *